United States Patent [19]

Imoto

[11] Patent Number: 5,259,058
[45] Date of Patent: Nov. 2, 1993

[54] NONLINEAR OPTICAL WAVEGUIDE DEVICE

[75] Inventor: Shouko Imoto, Tokyo, Japan

[73] Assignee: NEC Corporation, Tokyo, Japan

[21] Appl. No.: 901,249

[22] Filed: Jun. 19, 1992

[30] Foreign Application Priority Data

Jun. 28, 1991 [JP] Japan .................... 3-184198

[51] Int. Cl.$^5$ ............................ G02B 6/00; G02B 6/16
[52] U.S. Cl. .................................. 385/122; 385/141
[58] Field of Search .......................... 359/328-332; 385/122, 141, 142

[56] References Cited

U.S. PATENT DOCUMENTS

| | | | |
|---|---|---|---|
| 4,861,129 | 8/1989 | Che et al. | 385/142 X |
| 4,973,118 | 11/1990 | Enomoto et al. | 359/332 X |
| 5,011,250 | 4/1991 | Okada et al. | 359/332 |
| 5,023,477 | 6/1991 | Valley et al. | 359/326 |
| 5,175,784 | 12/1992 | Enomoto et al. | 359/328 |

OTHER PUBLICATIONS

"$Sc_2O_3$-doped $LiNbO_3$ grown by the float zone method" by Yamamoto et al., Journal of Crystal Growth 121, pp. 522-526 (1992).

"Optical, mechanical, and thermal Properties of barium borate" By Eimerl et al., J. Appl. Phys. 62 (5), pp. 1968-1983.

Primary Examiner—Akm E. Ullah
Attorney, Agent, or Firm—Leydig, Voit & Mayer

[57] ABSTRACT

A waveguide is formed by performing epitaxial growth of $\beta$-$BaB_2O_4$ on top of $\alpha$-$Ba_{1-x}Sr_xB_2O_4$ (where $0.04 \leq x \leq 0.10$). A nonlinear optical waveguide device using $\beta$-$BaB_2O_4$ can output a highly converted laser beam.

5 Claims, No Drawings

NONLINEAR OPTICAL WAVEGUIDE DEVICE

BACKGROUND OF THE INVENTION

1. Field of the Invention

This invention relates to a nonlinear optical waveguide device which uses $\beta$-$BaB_2O_4$ thin film on an $\alpha$-$Ba_{1-x}Sr_xB_2O_4$ substrate.

2. Description of the Prior Art $\beta$-$BaB_2O_4$ has a relatively high nonlinear optical coefficient and is transparent up to the ultraviolet region, which is superior as a crystal for harmonic generation. In the past, however, it was only used as a bulk single crystal. Used in this way, the input power to the device was increased making it possible to increase the optical energy density.

For nonlinear optical devices which used $\beta$-$BaB_2O_4$ being transparent up to the ultraviolet region, an optical waveguide was necessary in order to increase the optical energy density without increasing the input power to the device.

SUMMARY OF THE INVENTION

An object of this invention is to provide a nonlinear optical waveguide device which uses $\beta$-$BaB_2O_4$ that is capable of obtaining an output beam of a high optical energy density using a low output light source.

The aforementioned object of this invention is effectively accomplished by providing a nonlinear optical waveguide device comprising a substrate of $\alpha$-$Ba_{1-x}Sr_xB_2O_4$ wherein the subscript x satisfies the following relation: $0.04 \leq x \leq 0.10$, and a wavelength formed by performing epitaxial growth of $\beta$-$BaB_2O_4$ thereon.

DESCRIPTION OF THE PREFERRED EMBODIMENT

The applicant has found that when the Ba of $\beta$-$BaB_2O_4$ is partially substituted with Sr, $\alpha$-$Ba_{1-x}Sr_xB_2O_4$ wherein the subscript x satisfies the following relation: $0.04 \leq x \leq 0.10$, as shown in Table 1, the composition has a refractive index that is low as compared with $\beta$-$BaB_2O_4$. If a thin film is formed by performing epitaxial growth of $\beta$-$BaB_2O_4$ on an $\alpha$-$Ba_{1-x}Sr_xB_2O_4$ substrate ($0.04 \leq x \leq 0.10$), it is possible to form an optical waveguide using the difference in the refractive indices of the two.

TABLE 1

|  |  | Refractive index | |
|---|---|---|---|
|  |  | 1.064 $\mu$m wavelength | 0.532 $\mu$m wavelength |
| $\beta$-$BaB_2O_4$ | $n_o$ | 1.6570 | 1.6741 |
|  | $n_e$ | 1.5390 | 1.5541 |
| $\alpha$-$Ba_{0.96}Sr_{0.04}B_2O_4$ | $n_o$ | 1.6426 | 1.6597 |
|  | $n_e$ | 1.5246 | 1.5397 |
| $\alpha$-$Ba_{0.94}Sr_{0.06}B_2O_4$ | $n_o$ | 1.6444 | 1.6611 |
|  | $n_e$ | 1.5260 | 1.5411 |
| $\alpha$-$Ba_{0.93}Sr_{0.07}B_2O_4$ | $n_o$ | 1.6444 | 1.6615 |
|  | $n_e$ | 1.5264 | 1.5415 |
| $\alpha$-$Ba_{0.92}Sr_{0.08}B_2O_4$ | $n_o$ | 1.6446 | 1.6617 |
|  | $n_e$ | 1.5266 | 1.5417 |
| $\alpha$-$Ba_{0.90}Sr_{0.10}B_2O_4$ | $n_o$ | 1.6459 | 1.6630 |
|  | $n_e$ | 1.5279 | 1.5430 |

$n_o$: Refractive index for ordinary ray.
$n_e$: Refractive index for extraordinary ray.

Accordingly, for a nonlinear optical device which uses $\beta$-$BaB_2O_4$ being transparent up to the ultraviolet region, by creating a thin film waveguide structure, the propagation of light can be controlled inside the film, and thus the optical energy density of the output beam can be increased easily even if the input power is small. Thus, it is possible to obtain a highly converted laser beam having a short wavelength and which can use a low output light source.

Following, an embodiment of this invention will be described.

$BaCl_2 \cdot 2H_2O$ (0.96 mol), $SrCl_2 \cdot 6H_2O$ (0.04 mol) and $H_3BO_3$ (2.00 mol) were dissolved in 2 liters of water and adjusted to a pH of 12 to precipitate $Ba_{0.96}Sr_{0.04}B_2O_4 \cdot 4H_2O$. The resulting precipitate was then fired at 800° C. for 10 hours to obtain $\alpha$-$Ba_{0.96}Sr_{0.04}B_2O_4$. This powder was then put into a platinum crucible and an $\alpha$-$Ba_{0.96}Sr_{0.04}B_2O_4$ single crystal was grown using a normal single crystal pulling high frequency furnace. The pulling process was performed using a seed revolution of 20 rpm and a pulling speed of 3 mm/h in an atmosphere of air, and the direction of growth was along the c axis. The grown crystal was cut along the C plane and was processed to be used as a substrate.

The $\beta$-$BaB_2O_4$ powder was made by dissolving 1 mol of $BaCl_2 \cdot 2H_2O$ and 2 mol of $H_3BO_3$ in 2 liters of water and adjusting the pH to 12 to precipitate $BaB_2O_4 \cdot 4H_2O$ and then firing the resulting precipitate at 800° C. for 10 hours.

The $\beta$-$BaB_2O_4$ powder was used as a fusing material for liquid phase epitaxial growth, and the $\alpha$-$Ba_{0.96}Sr_{0.04}B_2O_4$ of the Z plane was used as the substrate in making a thin film of $\beta BaB_2O_4$ with a film thickness of 1 $\mu$m.

A 0.532 $\mu$m SHG beam was obtained from the outputting end of this thin film planar waveguide by inserting the LD pumped 1.06 $\mu$m Nd:YAG laser beam.

The same procedures as used in the above embodiment are repeated to give $\alpha$-$Ba_{0.94}Sr_{0.06}B_2O_4$, $\alpha$-$Ba_{0.93}Sr_{0.07}B_2O_4$, $\alpha$-$Ba_{0.92}Sr_{0.08}B_2O_4$ and $\alpha$-$Ba_{0.90}Sr_{0.10}B_2O_4$ in place of the $\alpha$-$Ba_{0.96}Sr_{0.04}B_2O_4$ used as the substrate and to make a thin film of $\beta$-$BaB_2O_4$ having a thickness of 1 $\mu$m thereon. For the thin film planar waveguide thus obtained, the highly converted laser beam as mentioned in the above embodiment can be obtained from the outputting end of the waveguide.

As was described above, this invention makes it possible to obtain an output beam of high optical energy density with low input power, and it is possible to provide a nonlinear optical waveguide device which uses $\beta$-$BaB_2O_4$. The nonlinear optical waveguide device can be utilized in a field of a laser processing, an optical disc memory or read, or the like.

What is claimed is:

1. A nonlinear optical waveguide device comprising a substrate of $\alpha$-$Ba_{1-x}Sr_xB_2O_4$ wherein the subscript x satisfies the relationship: $0.04 \leq x \leq 0.10$, and a waveguide of $\beta$-$BaB_2O_4$ epitaxially grown therein.

2. The nonlinear optical waveguide device as defined in claim 1 wherein said waveguide is a thin film planar waveguide.

3. A nonlinear optical waveguide device comprising a substrate of a $\alpha$-$Ba_{1-x}Sr_xB_2O_4$ having a refractive index of 1.6426 to 1.6459 at 1.064 $\mu$m wavelength of ordinary ray and a refractive index of 1.5246 to 1.5279 for extraordinary ray, wherein the subscript x satisfies the relationship: $0.04 \leq x \leq 0.10$, and a waveguide of $\beta$-$BaB_2O_4$ epitaxially grown thereon.

4. The nonlinear optical waveguide device as defined in claim 3 wherein said $\alpha$-$Ba_{1-x}Sr_xB_2O_4$ has further a refractive index of 1.6597 to 1.6630 at 0.532 $\mu$m wavelength of ordinary ray and a refractive index of 1.5397 to 1.5430 for extraordinary ray.

5. The nonlinear optical waveguide device as defined in claim 3 wherein said waveguide is a thin film planar waveguide.

* * * * *